(12) United States Patent  (10) Patent No.: US 8,319,775 B2
Gershfeld  (45) Date of Patent: Nov. 27, 2012

(54) METHOD AND APPARATUS FOR SHAPING A LINEAR SEGMENT

(76) Inventor: Jack Gershfeld, Fullerton, CA (US)

( * ) Notice: Subject to any disclaimer, the term of this patent is extended or adjusted under 35 U.S.C. 154(b) by 1169 days.

(21) Appl. No.: 12/173,638

(22) Filed: Jul. 15, 2008

(65) Prior Publication Data

US 2010/0013862 A1   Jan. 21, 2010

(51) Int. Cl.
*G06T 11/20* (2006.01)
(52) U.S. Cl. ......... 345/441; 345/442; 345/443; 345/677
(58) Field of Classification Search .................. None
See application file for complete search history.

(56) References Cited

U.S. PATENT DOCUMENTS

| 6,346,943 | B1 | 2/2002 | Thoemmes | |
|---|---|---|---|---|
| 6,911,981 | B2 | 6/2005 | Thoemmes | |
| 7,046,241 | B2 | 5/2006 | Arvin | |
| 7,098,933 | B1 | 8/2006 | Thoemmes | |
| 2002/0047845 | A1* | 4/2002 | Brett et al. | 345/441 |

* cited by examiner

*Primary Examiner* — Kee M Tung
*Assistant Examiner* — Jwalant Amin
(74) *Attorney, Agent, or Firm* — Vladimir Khiterer

(57) ABSTRACT

A method and apparatus for shaping a linear segment is disclosed. The method comprises the steps of selecting a dynamic bend point, determining a primary snap point based on the location of the dynamic bend point in one of four predetermined regions and snapping the dynamic bend point to the primary snap point. A secondary snap point is also determined and the dynamic bend point is snapped either to the primary snap point or to the secondary snap point, depending on the location of the dynamic bend point inside or outside a predetermined secondary snap region.

12 Claims, 10 Drawing Sheets

METHOD AND APPARATUS FOR SHAPING A LINEAR SEGMENT

BACKGROUND OF THE INVENTION

1. Field of the Invention

The present invention relates to a CAD (Computer Aided Design) method and apparatus for drawing images, and in particular to a CAD tool for shaping a linear segment.

2. Description of the Related Art

CAD software allows preparation and editing of machine drawings, schematics, artwork and other images. Typically, a CAD user creates these drawings by way of use of a library of objects and a number of drawing tools that allow to create, manipulate and shape the objects.

CAD is frequently used for designing wiring patterns of a printed circuit board and other types of electronic and electrical design that requires connecting various sets of terminals for components located in different parts of the drawing with wires. CAD is also often used to create system diagrams and assembly drawings showing connections between different types of equipment using electrical cables. Wires and cables are typically represented in CAD-drawn schematics as linear segments running from one graphic representation of a component terminal to the next. It is typically desirable to bend these linear segments at right angles in order to clear various graphic representations of components and other wires. Conventionally, grid within the CAD system can be used to draw linear segments at right angles. Additionally, keyboard entry of the length and angle of a segment is used to draw segments of desired length and at desired angles.

Alternatively, an existing linear segment can be shaped to have right angles by way of snapping portions of the linear segment to grid, thereby forming right angles. Another way of drawing segments at right angles is to use a constrain angle on a segment. Typically, one side of a segment is constrained to be at a desired angle and the other side is a free moving linear segment. This method allows only one side of the segment to be properly aligned.

These conventional methods are slow and cumbersome to use. What is needed is a tool that allows shaping linear segments quickly and without the grid. The present invention satisfies this need.

SUMMARY OF THE INVENTION

The method of the present invention comprises the steps of selecting a dynamic bend point, determining a primary snap point based on the location of the dynamic bend point in one of four predetermined regions and snapping the dynamic bend point to the primary snap point, thereby forming two new linear segments at the right angle at the desired location. In one embodiment, a secondary snap point is determined and the dynamic bend point is snapped either to the primary snap point or to the secondary snap point, depending on the location of the dynamic bend point inside or outside a predetermined secondary snap region. Provisions are made to display reference lines showing the direction of the snap for the dynamic bend point.

The apparatus comprises a means for selecting a dynamic bend point, means for determining a primary snap point based on the location of the dynamic bend point in one of four predetermined regions and means for snapping the dynamic bend point to the primary snap point, thereby forming two new linear segments at the right angle at the desired location. In one embodiment, means for determining a secondary snap point and means for snapping the dynamic bend point either to the primary snap point or to the secondary snap point, depending on the location of the dynamic bend point inside or outside a predetermined secondary snap region are provided. Also provided is means for displaying reference lines showing the direction of the snap for the dynamic bend point.

BRIEF DESCRIPTION OF THE DRAWINGS

Referring now to the drawings in which the same reference numbers and letters represent the same elements in all drawings.

DETAILED DESCRIPTION OF PREFERRED EMBODIMENTS

The drawings, which are part hereof, show, by way of illustration, several embodiments of this invention. It is understood that other embodiments may be utilized and structural changes may be made without departing from the scope of this invention.

Figure 1:
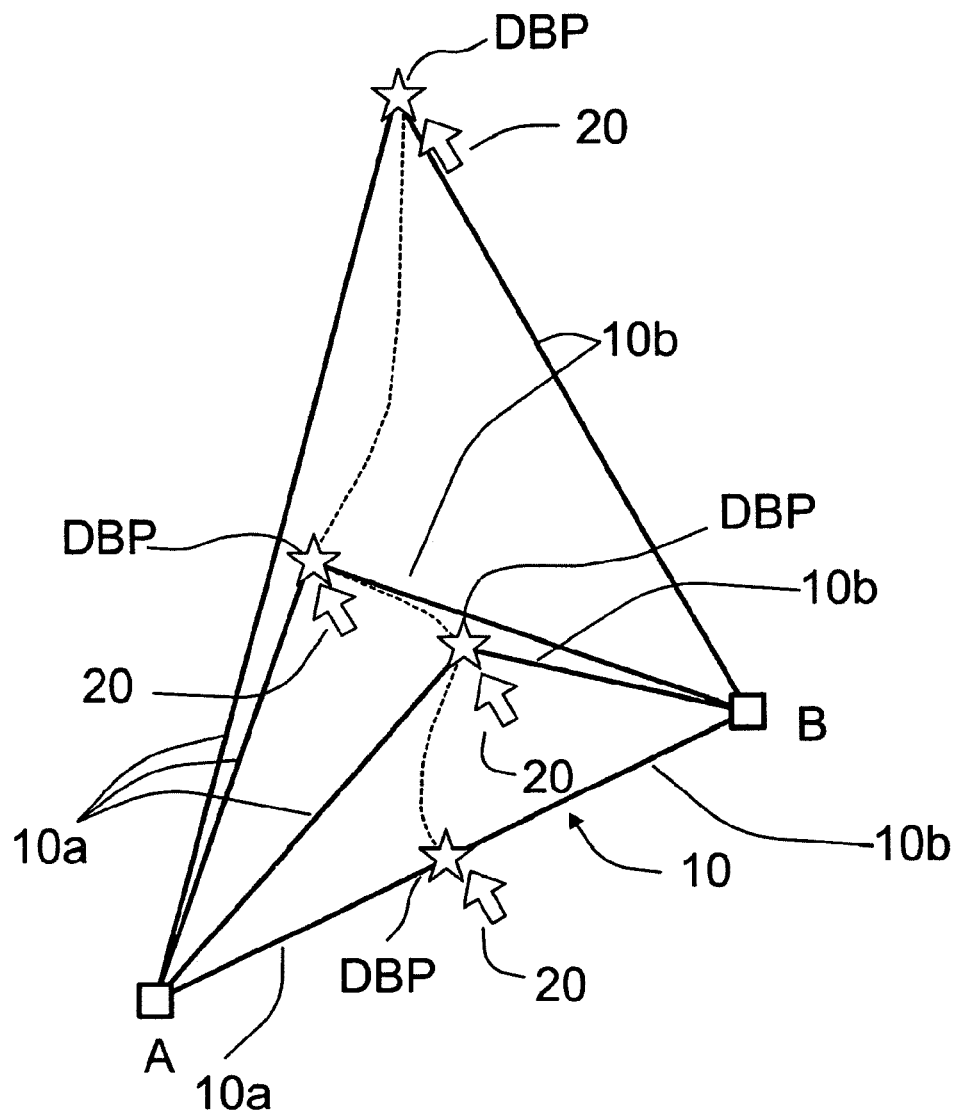
FIG. 1 is a diagram showing selecting a dynamic bend point on a linear segment and moving the dynamic bend point.

Viewing now FIG. 1, numeral 10 indicates an existing linear segment. Existing linear segment 10 comprises two end points indicated by letters A and B. Numeral 20 indicates a cursor. Cursor 20 is shown in FIG. 1 as an arrow. However, as the persons most knowledgeable in the pertinent arts will recognize, there are a number of ways that a cursor may be presented. Cursor 20 moves with movement of a pointing device, typically a computer mouse, and is used for selecting objects, typically by depressing a button on a computer mouse, known to the persons most knowledgeable in the pertinent arts as "clicking on an object".

Letters DBP indicate a dynamic bend point. Dynamic bend point DBP is selected anywhere on existing linear segment 10 between endpoints A and B. Depending on how the computer mouse or other pointing device is configured, selecting dynamic bend point DBP is typically accomplished by, for example, double clicking on existing linear segment 10. For the purposes of this discussion "selecting" also means "creating", such that dynamic bend point DBP is not present on existing linear segment 10 before it is selected by said double clicking.

Once selected, dynamic bend point DBP can be moved around by moving cursor 20. Once again, depending on how the computer mouse or other pointing device is configured, moving dynamic bend point DBP is typically accomplished by, for example, positioning cursor 20 over dynamic bend point DBP, depressing the mouse button and moving the mouse while maintaining the button on the computer mouse depressed.

Releasing dynamic bend point DBP is accomplished by releasing the button on the computer mouse.

End points A and B and dynamic bend point DBP define two new linear segments indicated by numerals 10a and 10b.

As shown in FIG. 1, moving cursor 20 while depressing the button on the computer mouse moves dynamic bend point DBP. Four positions of cursor 20 and corresponding positions of dynamic bend point DBP are shown in FIG. 1 for illustration. The path of cursor 20 is shown in dashed line.

As dynamic bend point DBP moves, two new linear segments 10a and 10b are being continuously reshaped as would rubber bands attached to endpoints A and B and to dynamic bend point DBP.

Figure 2:
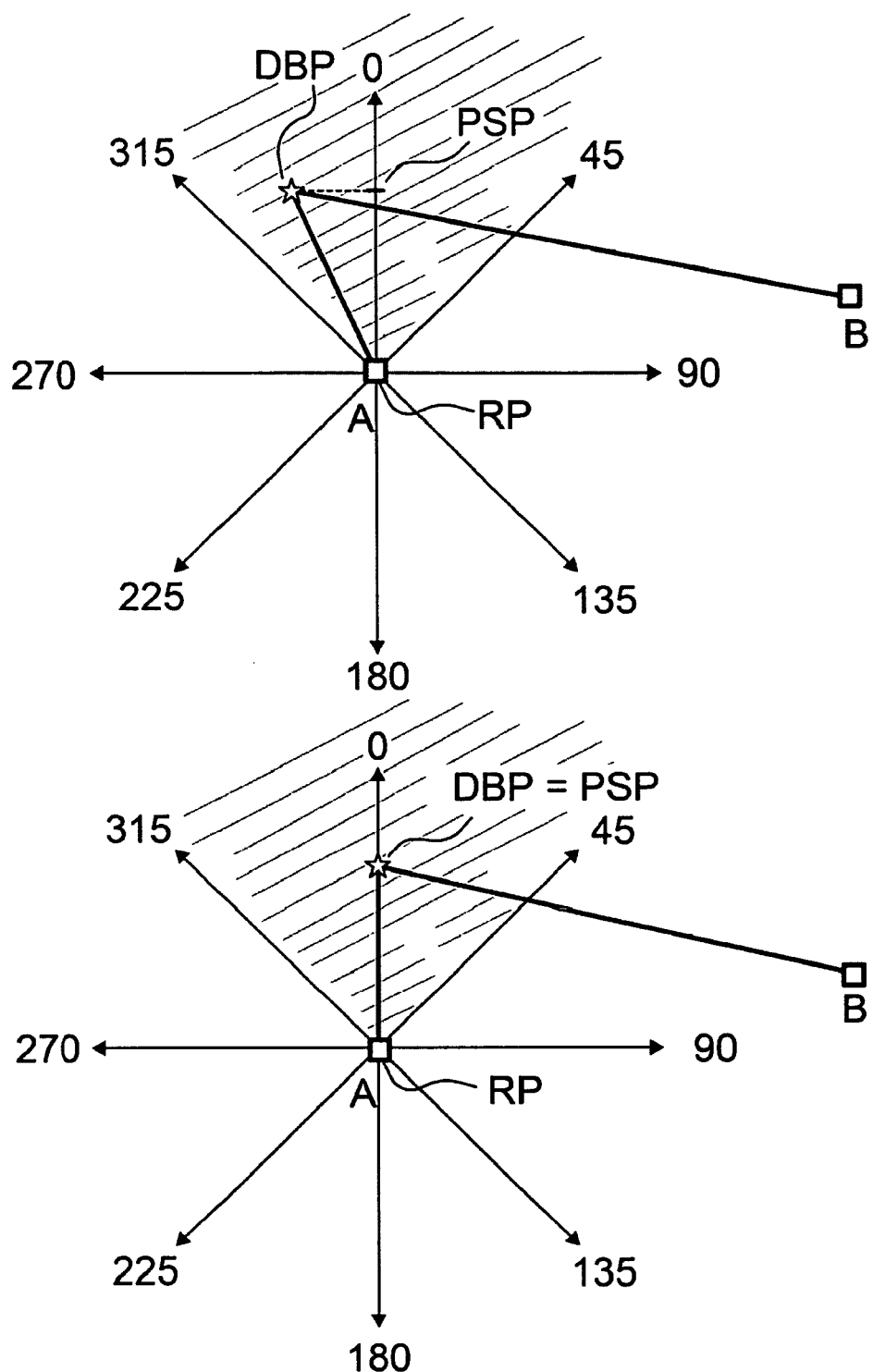
FIGS. 2-5 are diagrams showing the operation of one embodiment of this invention where the dynamic bend lo point is located, respectively, in a first, second, third and fourth regions.
Figure 9:
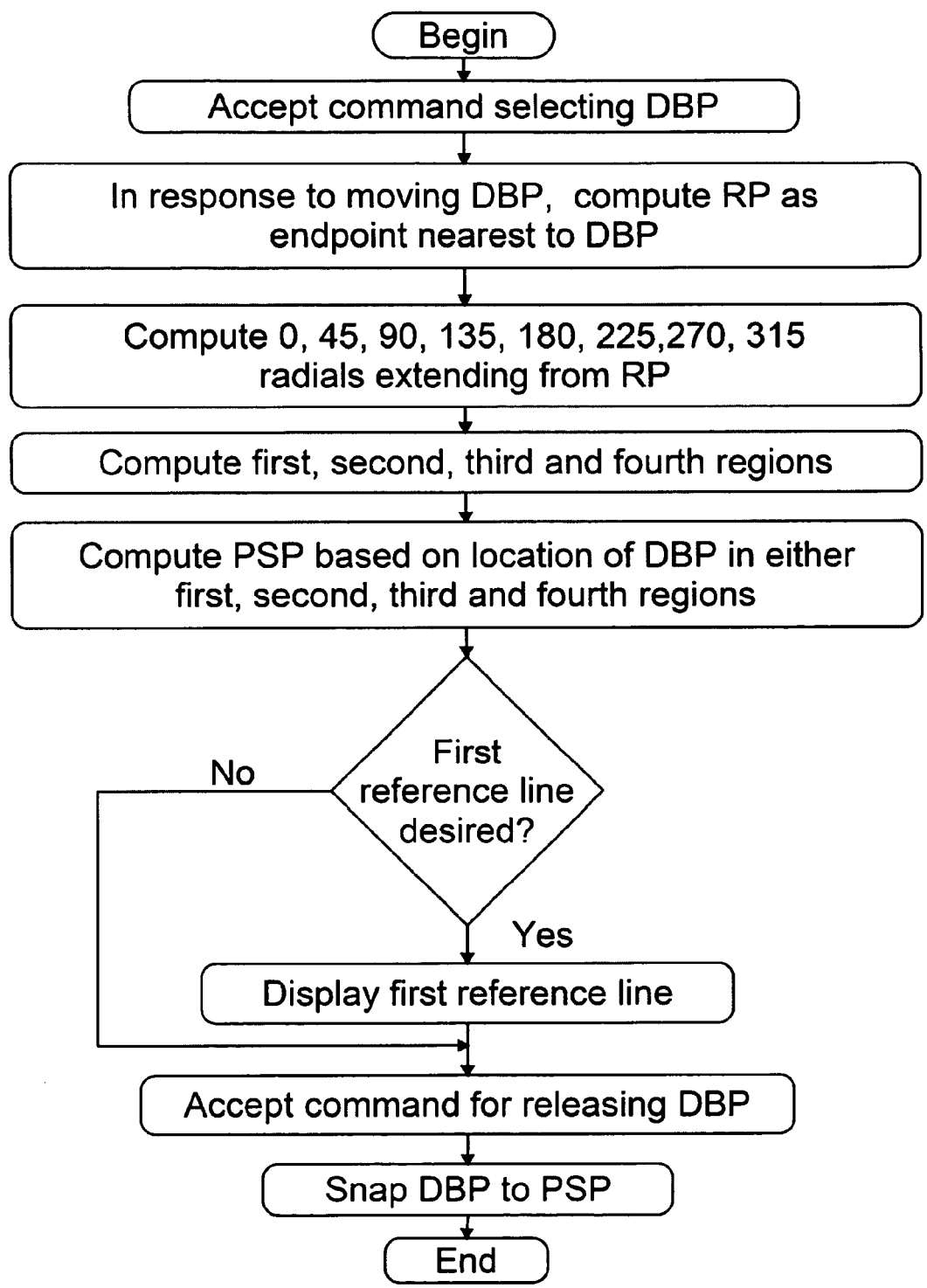
FIGS. 9, 10 are flow charts presenting illustrative examples of the steps used to implement the method of this invention.

Viewing now, simultaneously, FIG. 2 and FIG. 9, letters RP indicate a reference point. Reference point RP is determined continuously while moving dynamic bend point DBP that is the end point nearest to dynamic bend point DBP. Viewing the top portion of FIG. 2, dynamic bend point DBP is nearest to endpoint A. Therefore, reference point RP is computed to be located at endpoint A.

Extending from reference point RP are 0, 45, 90, 135, 180, 225, 270 and 315 radials. A first region is defined between 315 and 45 radials, a second region is defined between 45 and 135 radials, a third region is defined between 135 and 225 radials and a fourth region is defined between 225 and 315 radials.

Location of dynamic bend point DBP in one of the four regions is computed. In FIG. 2, dynamic bend point DBP is located in the first region. First region in FIG. 2 is shaded in order to illustrate the location of dynamic bend point DBP in the first region. Said shading of a region where dynamic bend point DBP is located in FIG. 2 and all other figures is utilized to assist in understanding this disclosure. The shading itself, however, is not part of this invention.

Letters PSP indicate a primary snap point. Primary snap point PSP, when dynamic bend point DBP is located in the first region, is computed as a 90 degree projection from dynamic bend point DBP on the 0 radial. Said projection is shown in FIG. 2 as a dashed line.

Viewing the bottom portion of FIG. 2, when dynamic bend point DBP is released, it snaps to primary snap point PSP.

Figure 3:
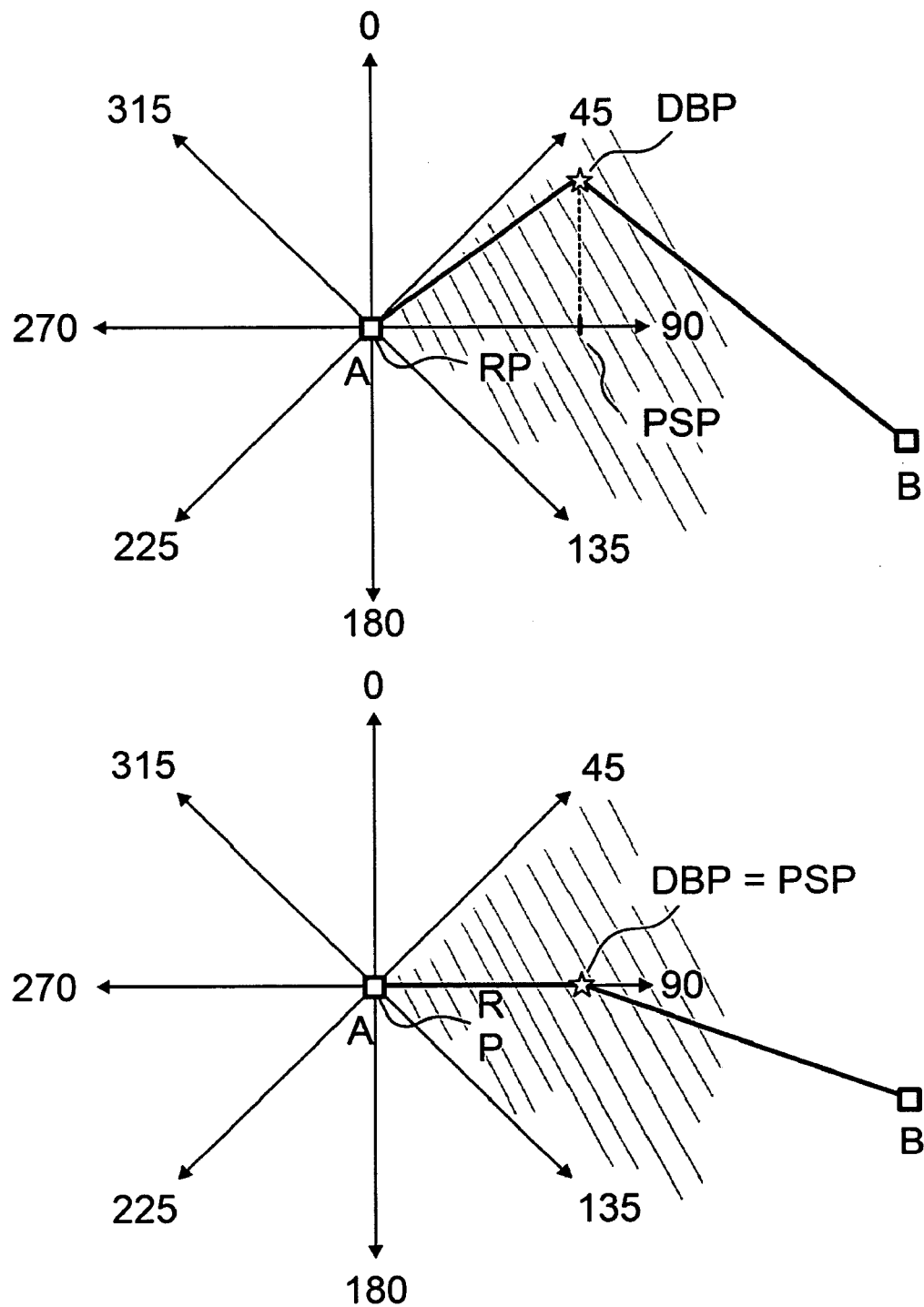

Viewing now, simultaneously, FIG. 3 and FIG. 9, as shown in the top portion of FIG. 3, dynamic bend point DBP is nearest to endpoint A. Therefore, reference point RP is computed to be located at endpoint A.

Location of dynamic bend point DBP in one of the four regions is computed. In FIG. 3, dynamic bend point DBP is located in the second region.

Primary snap point PSP, when dynamic bend point DBP is located in the second region, is computed as a 90 degree projection from dynamic bend point DBP on the 90 radial. Said projection is shown in FIG. 3 as a dashed line.

Viewing the bottom portion of FIG. 3, when dynamic bend point DBP is released, it snaps to primary snap point PSP.

Figure 4:
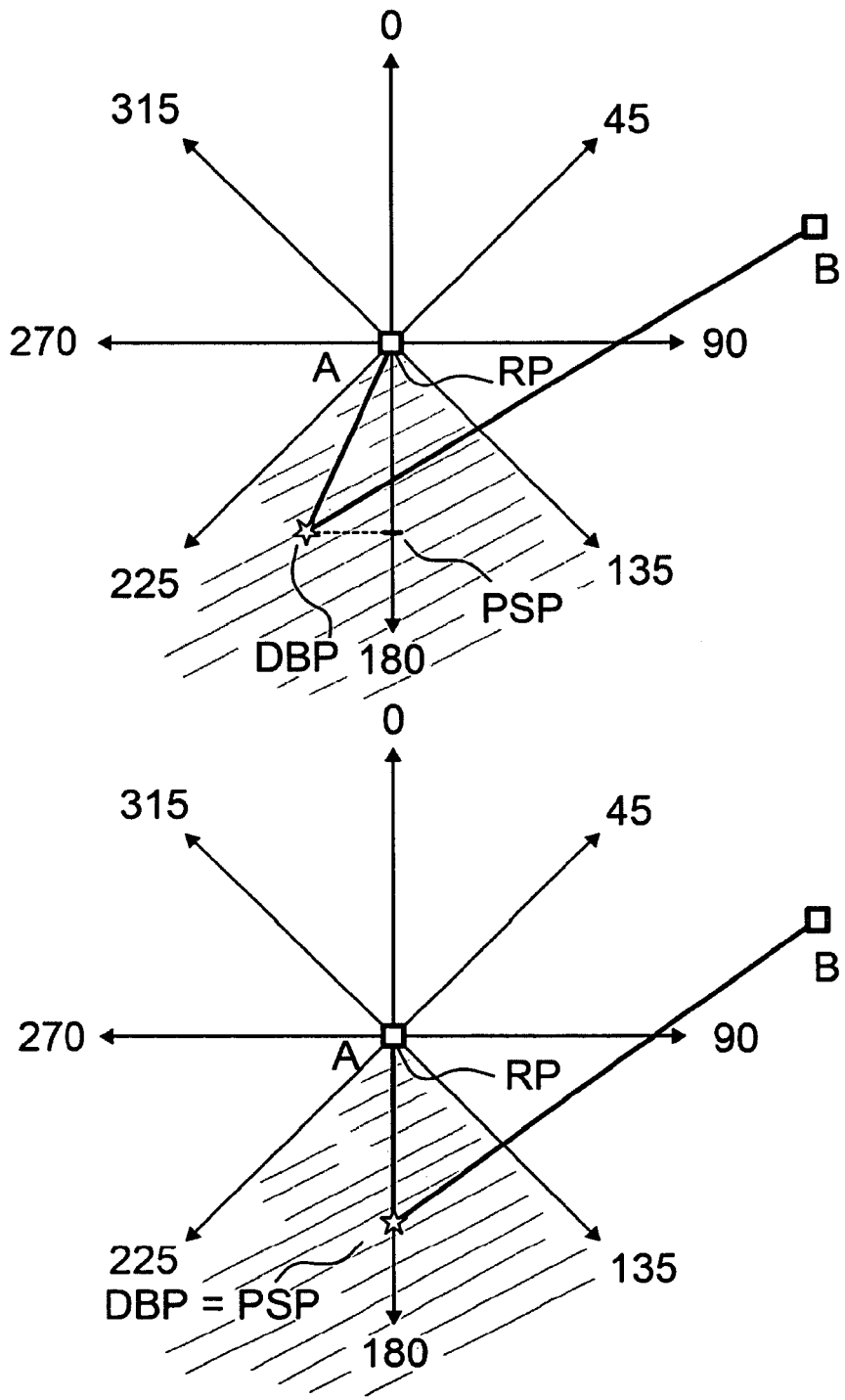

Viewing now, simultaneously, FIG. 4 and FIG. 9, as shown in the top portion of FIG. 4, dynamic bend point DBP is nearest to endpoint A. Therefore, reference point RP is computed to be located at endpoint A.

Location of dynamic bend point DBP in one of the four regions is computed. In FIG. 4, dynamic bend point DBP is located in the third region.

Primary snap point PSP, when dynamic bend point DBP is located in the third region, is computed as a 90 degree projection from dynamic bend point DBP on the 180 radial. Said projection is shown in FIG. 4 as a dashed line.

Viewing the bottom portion of FIG. 4, when dynamic bend point DBP is released, it snaps to primary snap point PSP.

Figure 5:
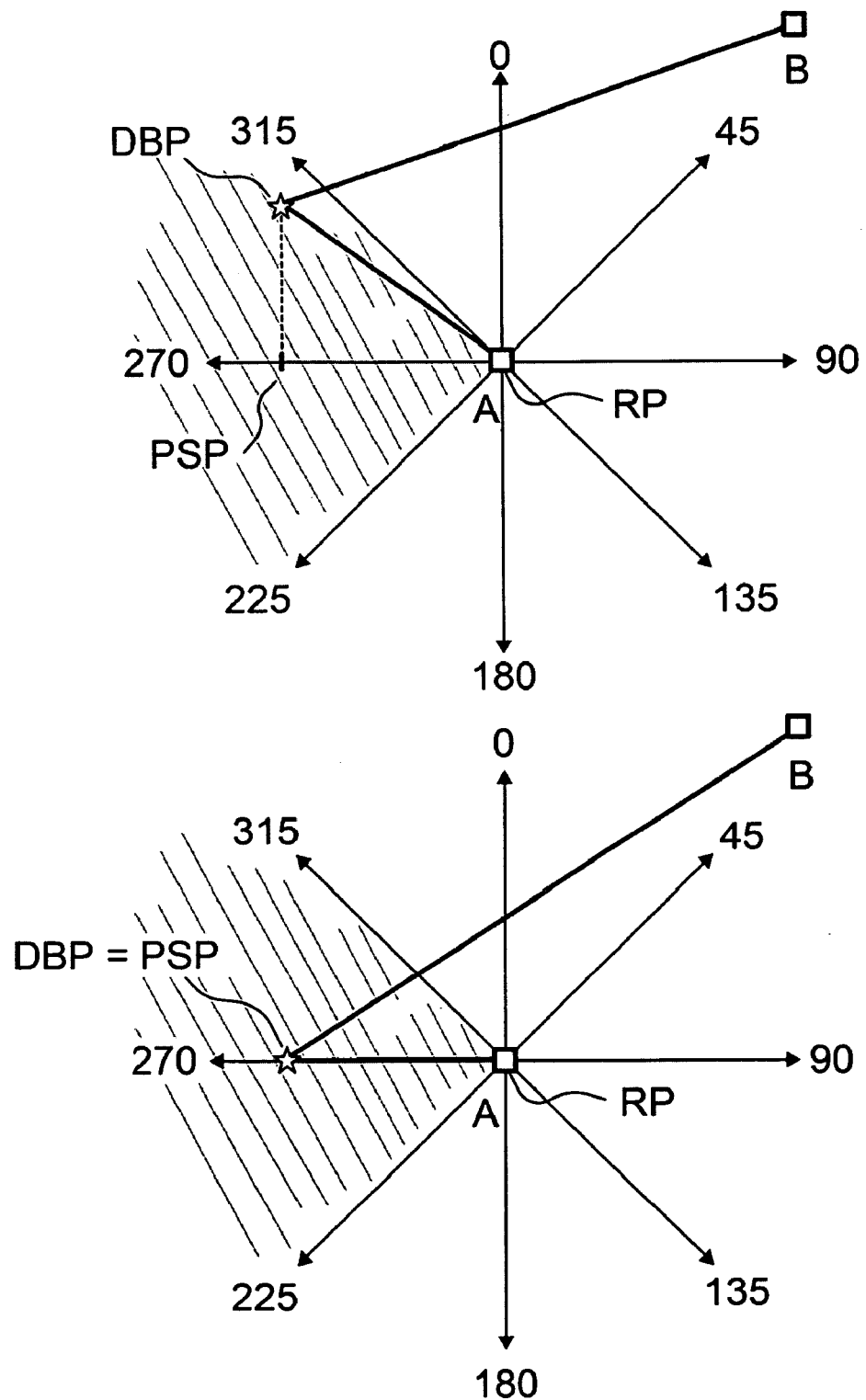

Viewing now, simultaneously, FIG. 5 and FIG. 9, as shown in the top portion of FIG. 5, dynamic bend point DBP is nearest to endpoint A. Therefore, reference point RP is computed to be located at endpoint A.

Location of dynamic bend point DBP in one of the four regions is computed. In FIG. 5, dynamic bend point DBP is located in the fourth region.

Primary snap point PSP, when dynamic bend point DBP is located in the fourth region, is computed as a 90 degree projection from dynamic bend point DBP on the 270 radial. Said projection is shown in FIG. 5 as a dashed line.

Viewing the bottom portion of FIG. 5, when dynamic bend point DBP is released, it snaps to primary snap point PSP.

Figure 6:
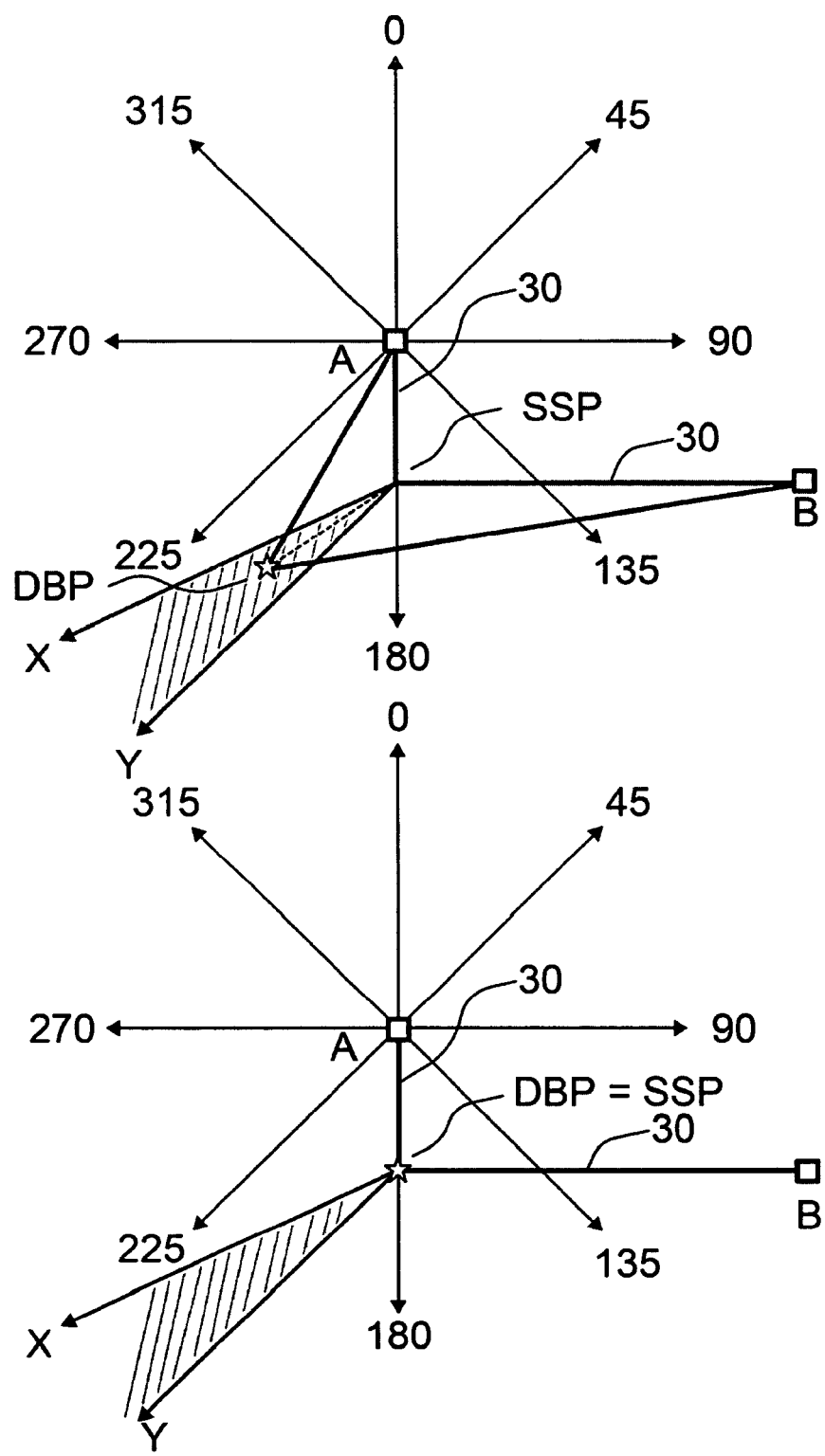
FIGS. 6, 7 are diagrams showing the operation of another embodiment of this invention where the dynamic bend point is located either inside or outside a secondary snap region.
Figure 10:
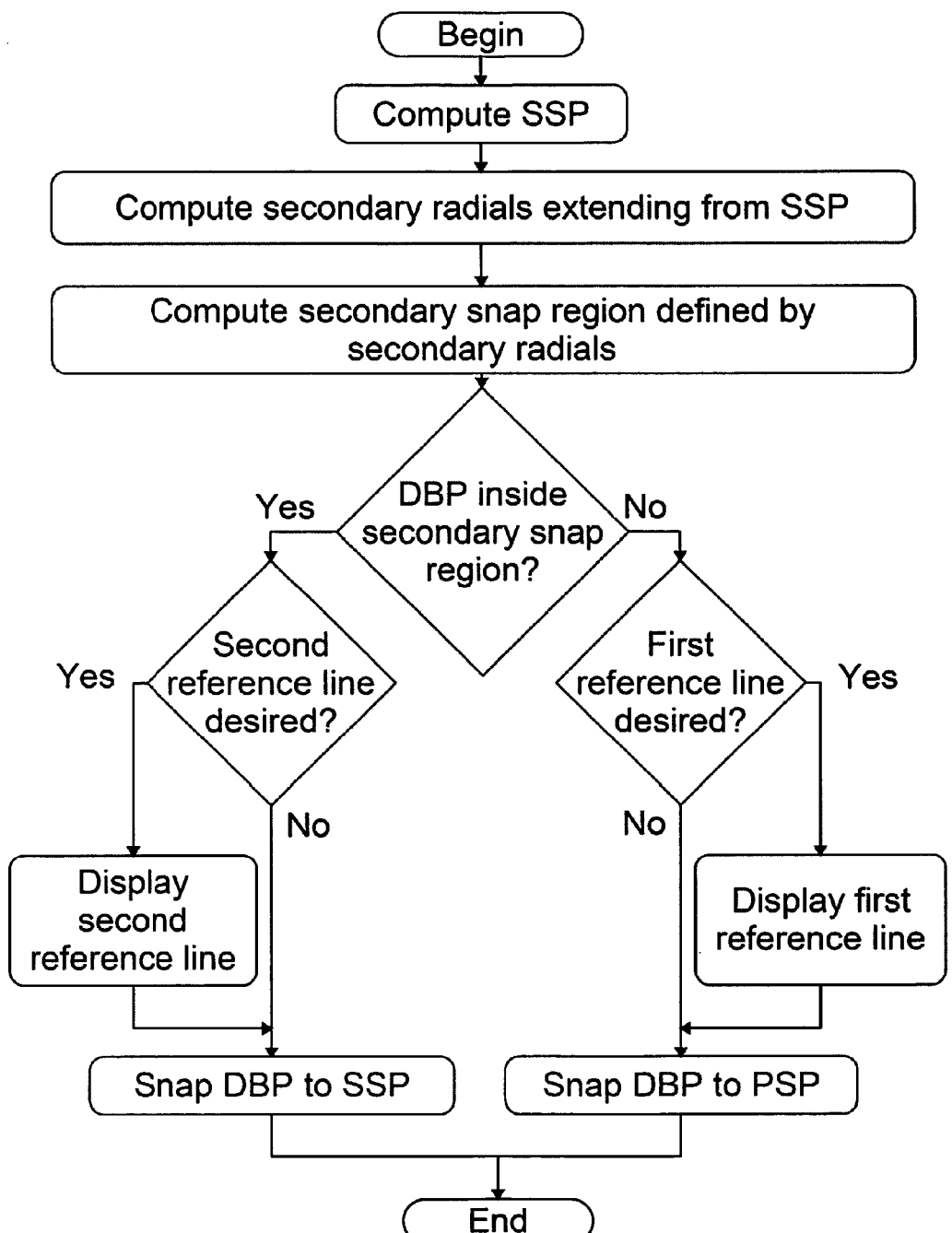

Viewing now, simultaneously, FIG. 6 and FIG. 10, letters SSP indicate a secondary snap point. Secondary snap point SSP is computed as a corner of an imaginary rectangle having diagonal corners in end points A and B. The sides of said imaginary rectangle are indicated by numeral 30.

Extending from secondary snap point SSP are radials X and Y. Radials X and Y extend from secondary snap point SSP at pre-settable angles that may be adjusted at user's preference. Radials X and Y define a secondary snap region.

Location of dynamic bend point DBP either inside or outside the secondary snap region is computed. In the top portion of FIG. 6, dynamic bend point DBP is shown inside the secondary snap region. When dynamic bend point DBP is located inside the secondary snap region, dynamic bend point DBP snaps to secondary snap point SSP, as shown by the dashed line in the top portion of FIG. 6.

Viewing the bottom portion of FIG. 6, when dynamic bend point DBP is released, it snaps to secondary snap point SSP.

Figure 7:
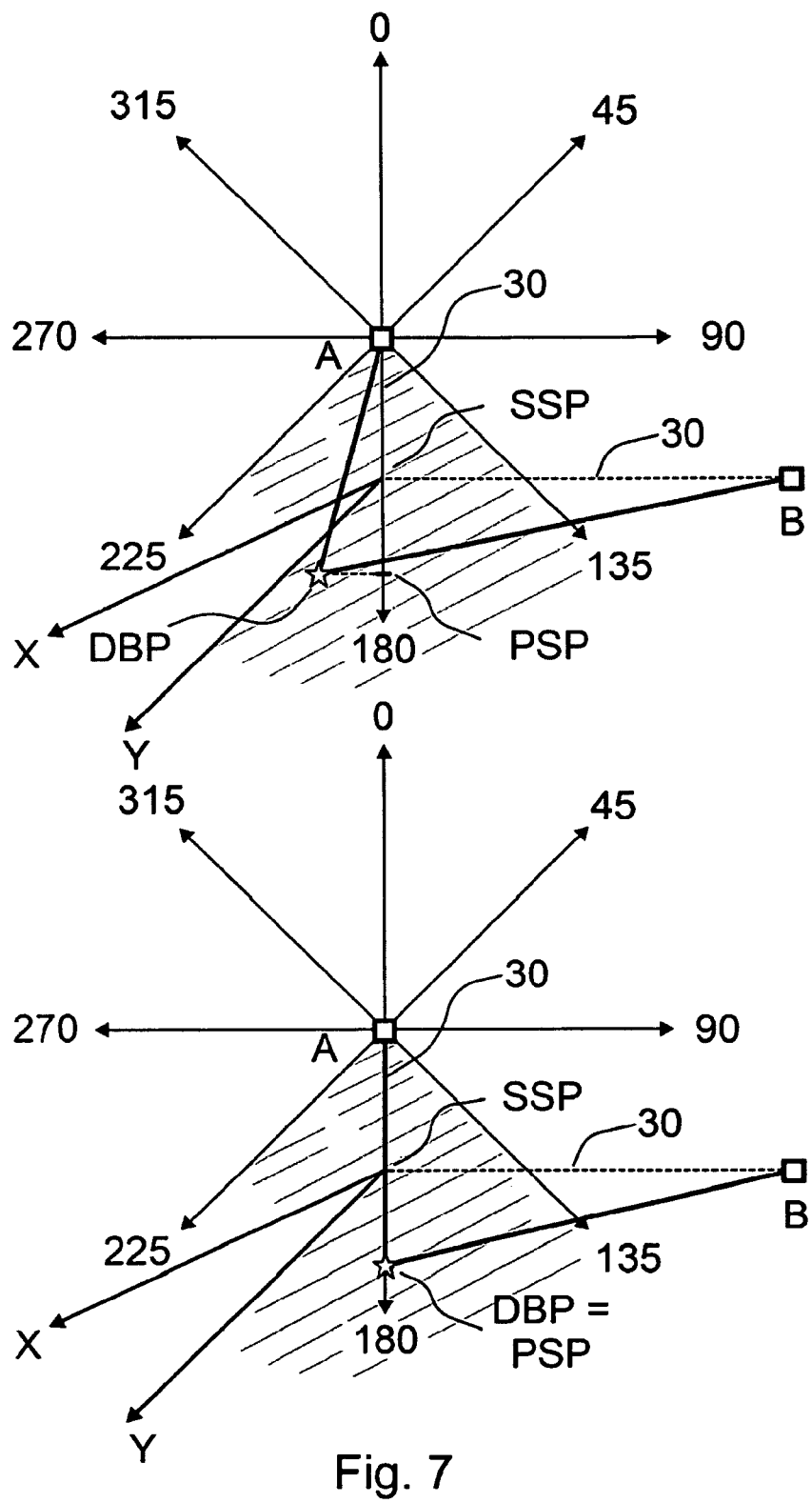

Viewing now, simultaneously, FIG. 7 and FIG. 10,

Location of dynamic bend point DBP either inside or outside the secondary snap region is computed. In the top portion of FIG. 7, dynamic bend point DBP is shown outside the secondary snap region. When dynamic bend point DBP is located outside the secondary snap region, dynamic bend point DBP snaps according to its location in the first, second, third or fourth regions.

In the top portion of FIG. 7, dynamic bend point DBP is shown inside the third region. Primary snap point PSP, when dynamic bend point DBP is located in the third region, is computed as a 90 degree projection from dynamic bend point DBP on the 180 radial. Said projection is shown in FIG. 7 as a dashed line.

Viewing the bottom portion of FIG. 7, when dynamic bend point DBP is released, it snaps to primary snap point PSP.

Figure 8:
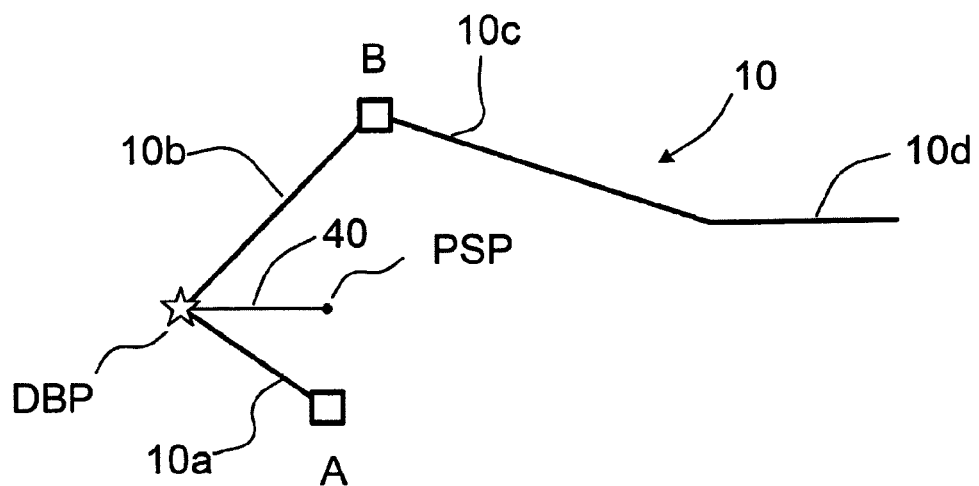
FIG. 8 is a diagram showing a displaying reference line for indicating the direction of the snap.
Figure 8:
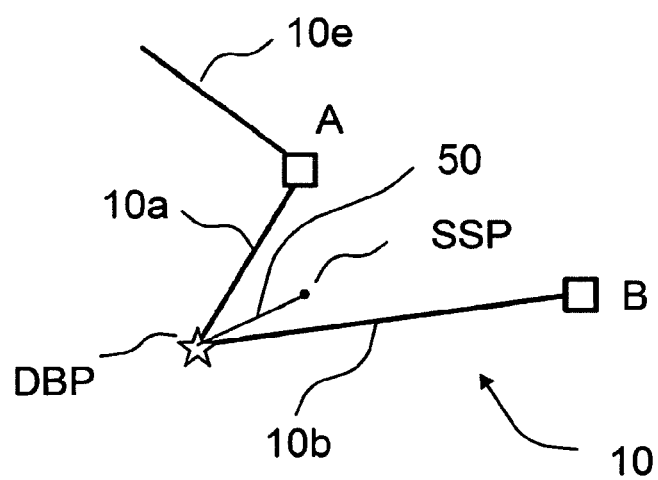

Viewing now simultaneously FIG. 8 and FIG. 9, top portion of FIG. 8 shows the embodiment where dynamic bend point DBP snaps to primary snap point PSP. Numeral 40 indicates a first reference line. First reference line 40 extends from dynamic bend point DBP towards primary snap point PSP and helps the user to visualize where dynamic bend point DBP will snap.

Bottom portion of FIG. 8 shows the embodiment where dynamic bend point DBP snaps to secondary snap point SSP. Numeral 50 indicates a second reference line. Second reference line 50 extends from dynamic bend point DBP towards secondary snap point SSP and helps the user to visualize where dynamic bend point DBP will snap.

Displaying either first reference line 40 or second reference line 50 can be enabled or disabled as a lo user's preference. First reference line 40 and second reference line 50 are typically presented in magenta color as rubber-banded lines.

Existing linear segment 10 is shown in FIG. 8 comprising a plurality of linear segments extending from end points A and B, indicated by numerals 10c, 10d and 10e. Presence or absence of such additional linear segments at either endpoint A or B does not affect the steps of the method in this invention.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of shaping a linear segment, implemented by way of a computer aided design software, comprising the steps of:
    selecting by a computer mouse, a dynamic bend point on an existing linear segment, wherein the existing linear segment comprising two end points, such that the dynamic bend point is between the end points, and the dynamic bend point defining two new linear segments;
    determining by a computer, while moving the dynamic bend point, a reference point that is the end point nearest to the dynamic bend point and primary snap point;
    releasing the dynamic bend point;
    snapping the dynamic bend point the primary snap point;
    wherein determining the primary snap point comprises the steps of:
    defining a $\alpha$ degree, $\beta$ degree, $\gamma$ degree, $\delta$ degree, $\epsilon$ degree, $\zeta$ degree, $\eta$ degree, and $\theta$ degree radials, each extending from the reference point;
    defining a first region between the $\theta$ degree and $\beta$ degree radials, defining a second region between the $\beta$ decree and $\delta$ degree radials, defining a third region between the $\delta$ degree and $\zeta$ degree radials, defining a four region between the $\zeta$ degree and $\theta$ degree radials;
    determining the primary snap point that is a 90 degree projection from the dynamic bend point on the $\alpha$ degree radial when the dynamic bend point is within the first region, determining the primary snap point that is a 90 degree projection from the dynamic bend point on the $\gamma$ degree radial when the dynamic bend point is within the second region, determining the primary snap point that is a 90 degree projection from the dynamic bend point on the $\epsilon$ degree radial when the dynamic bend point is within the third region, determining the primary snap point that is a 90 degree projection from the dynamic bend point on the $\eta$ degree radial when the dynamic bend point is within the fourth region.

2. The method of claim 1, wherein $\alpha$ equals 0, $\beta$ equals 45, $\gamma$ equals 90, $\delta$ equals 135, $\epsilon$ equals 180, $\zeta$ equals 225, $\eta$ equals 270 and $\theta$ equals 315.

3. The method of claim 2, further comprising the step of displaying a first reference line extending from the dynamic bend point towards the primary snap point.

4. The method of claim 3, further comprising the steps of:
    determining a secondary snap point that is a corner of an imaginary rectangle having diagonal corners in the end points;
    determining a secondary snap region defined by two secondary radials extending outwardly from the secondary snap point at pre-settable angles;
    snapping the dynamic bend point to the secondary snap point when the dynamic bend point is within the secondary snap region and snapping the dynamic bend point to the primary snap point when the dynamic bend point is outside the secondary snap region.

5. The method of claim 4, further comprising the step of displaying a second reference line extending from the dynamic bend point towards the secondary snap point.

6. The method of claim 5, wherein the existing linear segment comprises a plurality of linear segments extending from the end points.

7. An apparatus for shaping a linear segment comprising:
    means for selecting, on an existing linear segment comprising two end points, a dynamic bend point between the end points, such that the end points and the dynamic bend point define two new linear segments;
    means for determining while moving the dynamic bend point, a reference point that is the end point nearest to the dynamic bend point and means for determining a primary snap point;
    means for releasing the dynamic bend point;
    means for snapping the dynamic bend point to the primary snap point;
    wherein the means for determining the primary snap point comprises:
    means for defining a $\alpha$ degree, $\beta$ degree, $\gamma$ degree, $\delta$ degree, $\epsilon$ degree, $\zeta$ degree, $\eta$ degree, and $\theta$ degree radials, each extending from the reference point;
    means for defining a first region between the $\theta$ degree and $\beta$ degree radials, means for defining a second region between the $\beta$ degree and $\delta$ degree radials, means for defining a third region between the $\delta$ degree and $\zeta$ degree radials, means for defining a fourth region between the $\zeta$ degree and $\theta$ degree radials;
    means for determining the primary snap point that is a 90 degree projection from the dynamic bend point on the $\alpha$ degree radial when the dynamic bend point is within the first region, means for determining the primary snap point that is a 90 degree projection from the dynamic bend point on the $\gamma$ degree radial when the dynamic bend point is within the second region, means for determining the primary snap point that is a 90 degree projection from the dynamic bend point on the $\epsilon$ degree radial when the dynamic bend point is within the third region, means for determining the primary snap point that is a 90 degree projection from the dynamic bend point on the $\eta$ degree radial when the dynamic bend point is within the fourth region.

8. The apparatus of claim 7, wherein $\alpha$ equals 0, $\beta$ equals 45, $\gamma$ equals 90, $\delta$ equals 135, $\epsilon$ equals 180, $\zeta$ equals 225, $\eta$ equals 270 and $\theta$ equals 315.

9. The apparatus of claim 8, further comprising means for displaying a first reference line extending from the dynamic bend point towards the primary snap point.

10. The apparatus of claim 9, further comprising:
    means for determining a secondary snap point that is a corner of an imaginary rectangle having diagonal corners in the end points;
    means for determining a secondary snap region defined by two secondary radials extending outwardly from the secondary snap point at a pre-settable angle between the secondary radials;
    means for snapping the dynamic bend point to the secondary snap point when the dynamic bend point is within the secondary snap region and means for snapping the dynamic bend point to the primary snap point when the dynamic bend point is outside the secondary snap region.

11. The apparatus of claim 10, further comprising means for displaying a second reference line extending from the dynamic bend point towards the secondary snap point.

12. The apparatus of claim 11, wherein the existing linear segment comprises a plurality of linear segments extending from the end points.

* * * * *